(No Model.)
T. F. STRAUB.
METHOD OF CLARIFYING BEER AND CHARGING THE SAME WITH CARBONIC ACID GAS.
No. 336,073. Patented Feb. 9, 1886.
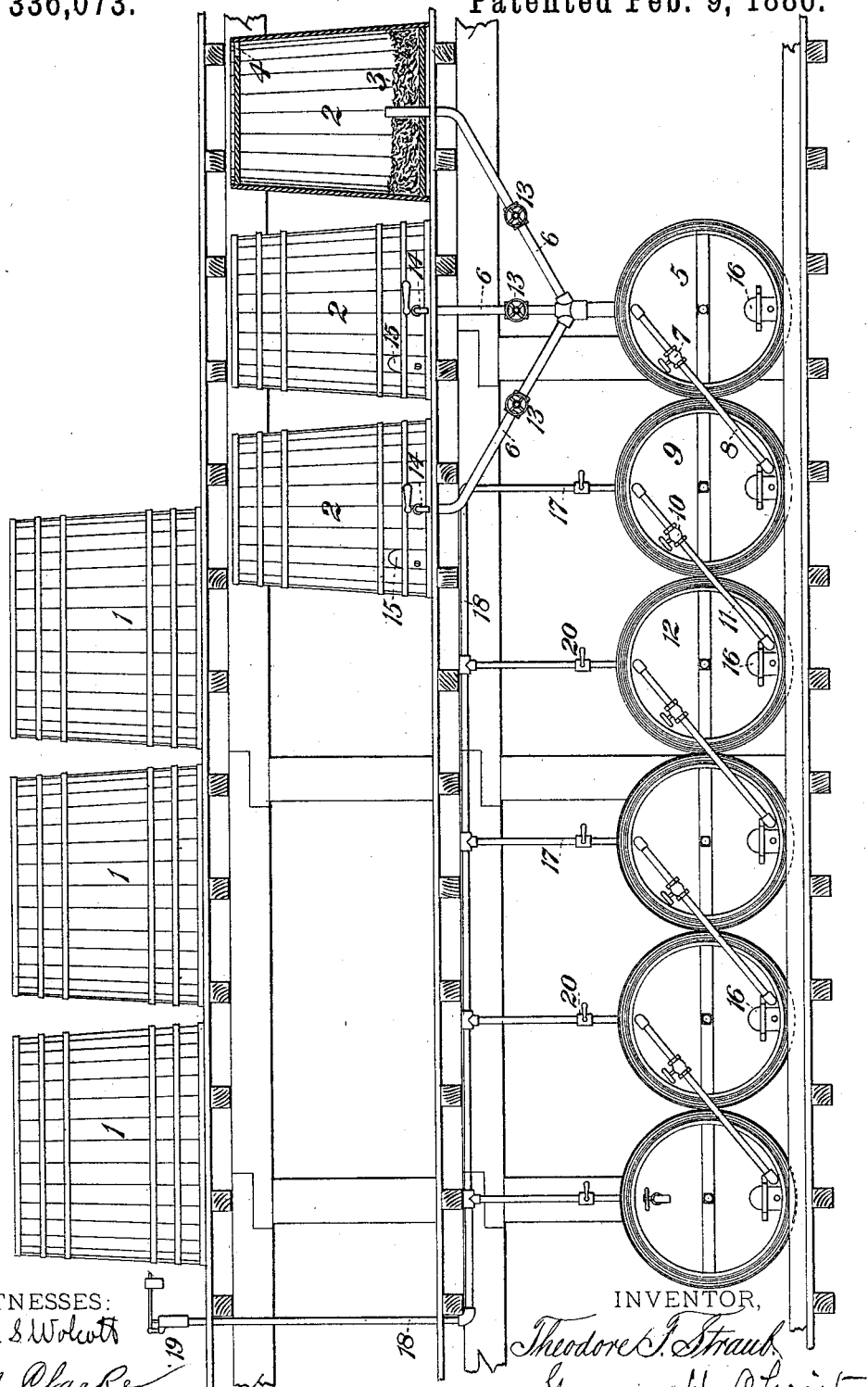
WITNESSES:
Darwin S. Wolcott
C. M. Clarke
INVENTOR,
Theodore F. Straub
BY George H. Christy
ATTORNEY.

UNITED STATES PATENT OFFICE.

THEODORE F. STRAUB, OF ALLEGHENY, PENNSYLVANIA.

METHOD OF CLARIFYING BEER AND CHARGING THE SAME WITH CARBONIC-ACID GAS.

SPECIFICATION forming part of Letters Patent No. 336,073, dated February 9, 1886.

Application filed October 14, 1885. Serial No. 179,834. (No model.)

*To all whom it may concern:*

Be it known that I, THEODORE F. STRAUB, residing at Allegheny, in the county of Allegheny and State of Pennsylvania, a citizen of the United States, have invented or discovered certain new and useful Improvements in the Methods of Clarifying and Carbonizing Beer, of which improvements the following is a specification.

In the accompanying drawing, which makes part of this specification, the figure is a view in elevation of the plant or apparatus for carrying out my improved method of refining or clarifying beer.

It has heretofore been customary to put the new beer into "stock-casks," from which it was afterward transferred as needed into "refining-casks," beech-chips and "krausen" being also charged therein for the purpose of producing the second fermentation by means of the krausen, and the collection and separation of impurities from beer. In the above-mentioned method it is necessary to clean the chips and casks at least once in two weeks, and also to employ expensive apparatus to transfer the beer from one set of casks to another.

My invention has for its object such an improvement in the method of refining and clarifying beer and other malt-liquors as will permit the automatic transfer of the beer from one set of casks to another, and effect a separation of the fermenting and clarifying processes, and will also effect a grading or separation of the beer in accordance with the progressive changes in specific gravity as the refining and clarifying action progresses; and to these ends my invention consists in the method substantially as hereinafter described and claimed.

After the first fermentation the beer is placed in the stock - casks 1, preferably arranged in one of the upper floors of the brewery, as shown. From these casks the stock-beer is run into one of the second-fermentation casks, 2, in sufficient quantities to fill said casks to about three-quarters of their capacity, the necessary quantity of beech-chips, 3, having been previously placed in said vat. Then the vat is entirely filled with a fermenting-agent, as krausen or new ferment-beer. The beer is allowed to ferment in this vat or tank for one or more days, as desired, the impurities being collected by the chips in the bottom, or else being ejected through the opening 4 in the head of the vat. The vats or tanks 2 are arranged on a floor below the stock-casks 1, for convenience in filling the vats 2 from the stock-casks. After this second fermentation has been continued for a sufficient length of time the beer is run into the refining or clarifying cask 5 through the pipe 6, projecting through the bottom of the vat 2 sufficiently far to bring its upper end above the level of the chips therein. The opposite end of this pipe 6 is inserted a considerable distance into the cask 5, as shown in dotted lines, in order to discharge the beer therein at a low level. The casks 5 are arranged preferably in their bilge on a floor below the vats 2, the distance between said floors being such that the beer in the pipe 6 will exert a hydrostatic pressure of six to ten pounds on the cask 5. After the cask 5 has been filled stock-beer is again run into the vat 2, and the krausen operation repeated therein. As soon as the new charge in the vat 2 is ready, the cock or valve 7 in the pipe 8, connecting the upper portion of the cask 5 with the lower portion of another refining and clarifying cask, 9, arranged alongside of the cask 5, is opened, thereby permitting the clarified beer in the upper portion of the cask 5 to flow into the cask 9, said clarified beer being forced from the cask 5 by the beer from the vat 2. A third charge of beer is then treated in the vat 2, and when ready the valve 7 is again opened, and also the valve 10 in the pipe 11, connecting the cask 9, and a third refining-cask, 12, in the same manner as the pipe 8, connects the casks 5 and 9. The beer will now flow from the vat 2 into the cask 5, displacing the partially-clarified beer therein and forcing it into the cask 9, and thus forcing the beer from the cask 9 into the next cask, 12. The beer is forced on and on, in the manner above described, through as many refining and clarifying casks as desired, the impurities of the beer being more or less completely deposited in the successive casks through which it passes. The last cask of the series is provided with a cock or faucet near its upper side for racking off the beer into the retail-casks.

For convenience I prefer to use three or more fermenting-vats, 2, as shown, each vat being provided with a pipe, 6, connecting it with the first refining and clarifying cask, 5, and each pipe 6 is provided with a valve or cock, 13, for the purpose of opening and closing communication between the vats and the cask 5, as desired.

In operating with three or more fermenting-vats, 2, the second vat is charged with stock-beer from the tanks 1, and with krausen and chips. After the contents of the first vat have been run into the cask 5, and while the fermentation is being effected in the second vat, the third vat is charged, and the first vat is cleaned, if necessary. As soon as one vat is emptied, the valve 13 in its pipe 6 is closed, and the similar valve in the pipe of the next vat is opened, thus preserving a constant hydrostatic pressure in the refining and clarifying casks. Each of the vats 2 is provided with a draining-faucet, 14, whereby its liquid contents can be completely removed, and also with a man-hole, 15, for the purpose of cleaning the chips, and each refining-cask is also provided with a man-hole, 16, for the same purpose. The ends of the pipes connecting the refining and clarifying casks are inserted into one cask about six inches from its upper side, and into the next cask about the same distance from its lower side, thus providing for the removal of the best or clearest beer from one cask into the next cask. Each charge is allowed to stand one or more days in each refining-cask, to allow the impurities therein to settle to the bottom of the cask.

A vent-pipe, 17, is inserted in the upper side of each refining-cask except the first, and is connected with a pipe, 18, provided at one end with an escape-valve, 19, regulated to permit escape of gas at a little less pressure than that exerted by the hydrostatic column from the vats 2. Each vent-pipe 17 is provided with a valve, 20, which is open to permit of the escape of gas from the casks at the same time that a transfer of charges from one cask to the next is made; otherwise the pressure of the gas might become so great as to force the beer in said casks below the exit of the pipes connecting the casks.

By the use of refining and clarifying casks from which the fermenting agent is excluded the aging of the beer is greatly accelerated. The presence of the fermenting retards this aging operation.

The specific gravity of the beer is being constantly changed during its passage through the refining and clarifying casks—as, for example, the beer in the upper part of the cask 5 is of less specific gravity than that received into the lower part of the same from the vat 2, and the beer in the lower part of the cask 9 is of greater specific gravity than that in the upper part of the same cask. It will thus be seen that as the beer flows from one cask to another the beer of the less specific gravity is displaced and forced onward by a beer having a greater specific gravity.

By holding the beer in the manner above stated during the slight fermentation which occurs in the refining and clarifying casks the beer will become thoroughly charged with carbonic-acid gas, which in the old process was allowed to escape, as the second fermentation and the refining were effected in the same cask or receptacle.

I am aware that beer has been held under controllable hydrostatic pressure during fermentation; but in my improved process the fermentation is effected in casks or vats having unobstructed openings for the escape of the barm and gases generated during fermentation.

I claim herein as my invention—

1. As an improvement in the art of treating beer and other malt-liquors while undergoing fermentation and clarification in separate but connected receptacles, the herein-described method, which consists in causing a hydrostatic pressure from the fermenting-receptacle to act on the previously-fermented contents of one or more clarifying-receptacles in the direction of onflow or discharge from the latter, substantially as set forth.

2. In the art of clarifying beer and other malt-liquors while inclosed in a series of two or more separate but communicating clarifying-receptacles, the herein-described method, which consists in causing a fluid-pressure to act continuously on the contents of the first in the series, and thereby effect the through flow of the contents of all from one to another as and only as the finally clarified liquor is racked or drawn off from the last of the series, substantially as set forth.

3. In the art of clarifying beer and other malt-liquors while inclosed at different specific gravities in a series of two or more separate but communicating clarifying-receptacles, the herein-described method, which consists in causing the higher-specific-gravity liquor of the first receptacle to displace the lower-specific-gravity liquor of the next receptacle, substantially as set forth.

4. As an improvement in the art of treating beer, the herein-described method, which consists in effecting the second fermentation in one or more vats and clarifying and refining the same in separate casks while subjected to a constant hydrostatic pressure, substantially as set forth.

In testimony whereof I have hereunto set my hand.

THEODORE F. STRAUB.

Witnesses:
DARWIN S. WOLCOTT,
R. H. WHITTLESEY.